DATA SELECTION DEVICE

Filed May 24, 1954 2 Sheets-Sheet 1

INVENTOR.
Luis A. Fernandez Rivas

BY Morris B. Pick...

ATTORNEY

DATA SELECTION DEVICE

Filed May 24, 1954 2 Sheets-Sheet 2

INVENTOR.
Luis A. Fernandez Rivas
BY Morris A. Rabkin
ATTORNEY

United States Patent Office 2,926,337

Patented Feb. 23, 1960

2,926,337

DATA SELECTION DEVICE

Luis A. Fernandez Rivas, Levittown, Pa., assignor to Radio Corporation of America, a corporation of Delaware Application May 24, 1954, Serial No. 431,627

12 Claims. (Cl. 340—174)

This invention relates to data-processing systems and information handling systems, and more particularly to a device for selecting data from groupings of information.

Computing and data-processing machines are widely known and used in present day commerce. Computing machines are employed for solving engineering and scientific problems and manipulating large masses of numeric information. Data-processing machines of a commercial nature often utilize punched cards or perforated paper tape for representing information. Systems are provided for such cards and tape for performing sorting and accounting operations. These systems are adequate for performing many commercial data-processing operations. However, certain modern applications of data-processing are so extensive that systems of even greater economy, speed, and capacity are desirable. There exists a need for electronic data-processing systems capable of performing sorting, collating, and tabulating functions, which utilize techniques and storage mediums even more efficient than those mentioned above.

As a specific example of this need, consider conventional sorting techniques with schemes presently employed. When information is represented by perforations on a paper tape or on a punched card, the information may be regarded as being in permanent form. To sort this information requires either that duplicate records be created or that the sorting process be repeated a number of times with each repetition making a successive distinction as to the sorting criterion. Greater processing speeds, and much larger information handling capacity, may be obtained if the recording medium employed is magnetic tape, and if modern electronic techniques are utilized for representing and manipulating the information stored on the magnetic tape.

An information handling system should have a great deal of flexibility and versatility. The system should be capable of performing various sorting routines, and should be capable also of using different sorting criteria for the information it is handling. For example, it may be desired that a system be able to select desired blocks of information within the basic groupings of information which it stores and manipulates. In a practical situation, an information grouping, which may be termed a message, may consist of a number of blocks, which may be termed items. The items, used singly or in combination, may represent specific types of information, such as name, address, and occupation, which form separate bases for classifying.

In data-processing systems, particular advantages are to be gained from the employment of the binary system of notation. Binary notation, which is widely used in the computing field, has many variations evolving from a pure binary notation. In pure binary notation, a number is written as in decimal notation, with the most significant digit at the left and digits of lesser significance arranged in the succeeding positions, and in order, to the right. Digital positions represent the varying powers of two, in contrast with the varying of powers of ten employed in the decimal system of notation. At each binary position only one of two digits is employed. These digits are binary "1" and binary "0." The selection of a binary "1" at a binary position means that the corresponding power of two is added in the number, while the selection of a binary "0" at a binary digital position means that the corresponding power of two is not added in the number. For example, binary number 10110 is the equivalent of decimal twenty-two, since the powers of two selected are $2^4$ (sixteen), $2^2$ (four), and $2^1$ (two), which, added together, make twenty-two.

Among the advantages of employing a binary system of notation in an information handling scheme are:

(1) Facility in representing situations and logical values which either exist or do not exist (situations which themselves have conditions of a binary nature).

(2) Ease in representing alphabetic as well as numeric characters.

(3) Inexpensive implementation of systems for representing and manipulating data. Because only two possibilities exist for each binary digit, digits may be represented by any arrangement which presents only two alternatives, such as conduction and non-conduction in a vacuum tube or on and off switch positions.

By way of example, a binary seven digit number may represent alphabetic and numeric information by a predetermined coding. The numeric characters in the code may be those from 0 to 9, decimal numbers of ten or greater being represented by a succession of the seven digit binary numbers, one for each decimal digit. Thus, for numeric information only, such a code is sometimes termed a binary decimal code. Other unique combinations of the seven binary digits may be employed to represent alphabetic characters and special symbols, each such characters being distinct and different. Such a system of coding which includes the decimal and alphabetic characters is sometimes referred to as an alpha-numeric code.

A novel system for selecting information in an information handling system is shown and claimed in a copending application for patent entitled "Information Selecting System," Serial No. 418,679, filed March 25, 1954, by Joel N. Smith now United States Patent 2,854,652, issued September 30, 1958. The system described in this Smith application selects a given sequence of characters or a given sequence of items from within the body of a message for use as a sorting criterion in an information handling system. The system operates effectively for this purpose and for performing a wide range of selective functions. It may be desired, however, to utilize other features with such a data selection system. For example, it may be desired to construct the unit of logical circuits utilizing rectifying elements, and to integrate the unit in a system utilizing timing pulses.

Accordingly, an object of this invention is to provide an improved device for selecting data in an information handling system, which device is simpler than those of the prior art.

A further object of this invention is to provide an improved device for providing a data selecting signal on the occurrence of a desired sequence of characters or items in an information processing system, which device operates reliably and rapidly.

Yet another object of this invention is to provide an improved device for selecting data from messages composed of a train of characters formed into individual items, said device being constructed from standardized units in an economical and simple arrangement.

A further object of this invention is to provide an improved data selecting device for use with a data sorting system employing timing pulses, which device primarily employs rectifiying elements in an arrangement which is simpler and more economical than the devices of the prior art.

Yet another object of this invention is to provide a data selection unit of improved construction having a minimum number of counting means for providing a variety of counting functions.

Another object of this invention is to provide an improved data selection unit employing fewer counting means than the prior art.

Still another object is to provide an improved data selection unit which utilizes a single binary counter while providing a number of counting functions.

In accordance with the invention, a data selecting arrangement is provided which selects a given sequence of characters or items from trains of characters grouped into messages. A single counter may be employed, and a number of count detectors employed to detect various counts on the counter. In a particular arrangement, means are employed to provide inputs in a controlled sequence from various sources to the counter. The operation is controlled by a gating arrangement coupled to the counter and count detectors. Input signals representative of items or characters are applied to the counter until the desired count has been reached. One count detector then provides an output which is used to indicate that the following data is to be selected from within a message, and to condition the system for the succeeding operation. Further input information, whether of characters or items, is then again counted by the counter. Another count detector then signals the occurrence of the completion of the desired sequence of information, and terminates the data selection signal.

The novel features of the invention, as well as the invention itself, both as to its organization and method of operation, will best be understood from the following description, when read in connection with the accompanying drawings, in which like reference numerals refer to like parts, and in which.

A data-processing system (see Fig. 1) may constitute the general environment of an arrangement for practicing this invention. The data-processing system may, for example, be a sorting system of the type described in an application entitled "Sorting Apparatus," Serial No. 427,167, filed May 3, 1954, by Howard P. Guerber, and assigned to the assignee of the present invention. Such a system may employ a number of magnetic tapes for storing or representing information, and may manipulate the information represented on those tapes in various ways. A sorter may, for example, classify information according to particular characteristics. Thus, if a number of messages each composed of name, address, and occupation, are recorded separately on the tapes, the sorter may arrange the messages in accordance with an alphabetical listing of the names, or classify the messages by occupation. Such an operation, however may require that the names be selected from the messages as the basis for the sorting procedure, and for this purpose the data selection unit of the present invention may be employed.

For the purpose of illustrating this invention, blocks of information will be termed items and groupings of items will be termed messages. The messages, and the blocks or items within the messages, will be assumed to be composed of trains of individual characters. The termination of items will be denoted by item separator signals having singular properties. The information is assumed to be in a seven digit alpha-numeric code such as previously mentioned, so that special signals such as item separator signals (ISS) are particular combinations of binary digits in the code. Other signals which are employed to represent special characteristics are start message (SM) and end message (EM) signals. A message begins with an SM signal followed by an ISS signal, then has a train of character signals with an ISS signal interspersed at the end of each item, or signifying each unused item, and terminates with an EM signal.

Figure 1:
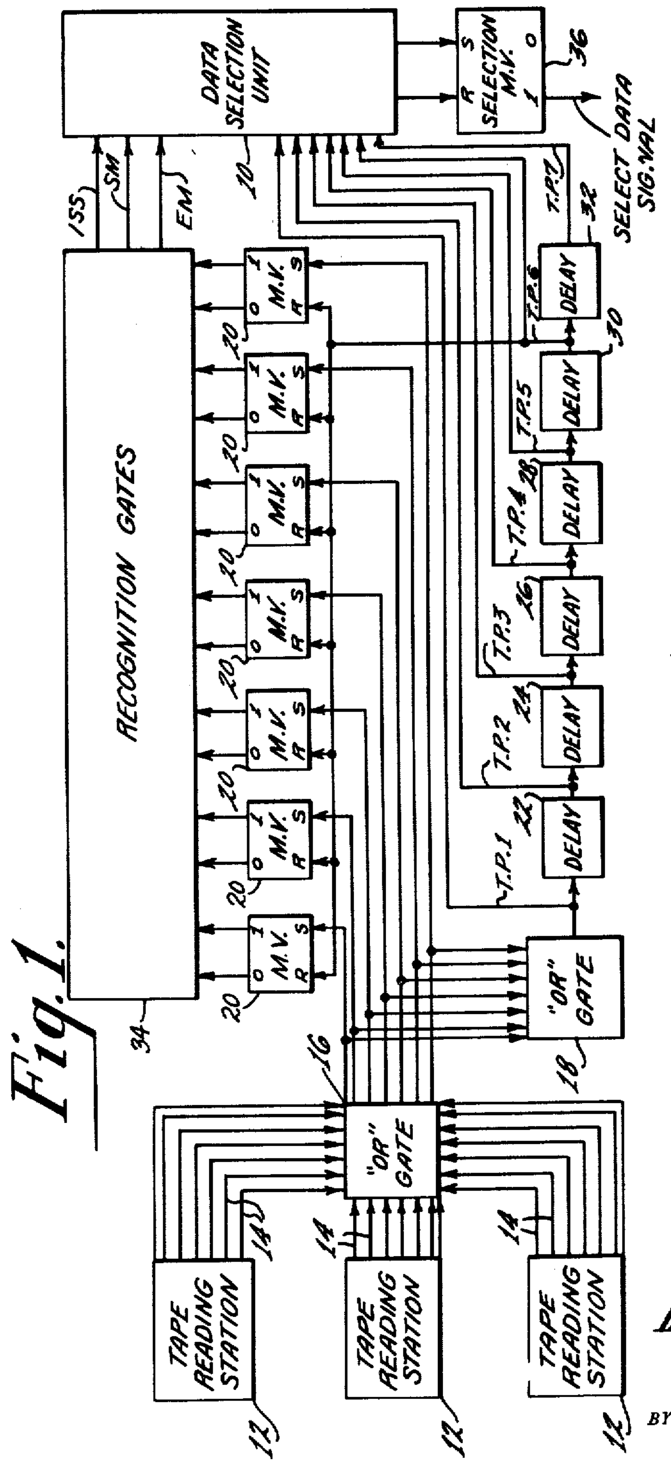
Fig. 1 is a block diagram of a portion of a system for data processing which provides inputs to, and derives outputs from, a data selection unit of the type employed in practicing this invention.

The system of Fig. 1 comprises an arrangement for providing inputs to a data selection unit 10. Three tape reading stations 12 are employed, each having seven output conductors 14 for carrying signals in a seven digit alpha-numeric code. The conductors 14 from each of the tape reading stations 12 are brought together at an "or" circuit or gate 16, the like channels of each set of conductors 14 being united to form a single output channel from the "or" gate 16. An "or" circuit, or mixer, herein termed an "or" gate, has a plurality of inputs for each output, and provides an output signal when an input signal is present on any one or more of the plurality of inputs. The "or" gate 16 is a composite of seven component "or" circuits, each of which has three inputs and one output. Like output conductors 14 from each of three tape reading stations 12 are coupled together at each of the component "or" circuits. Thus the "or" gate 16 has three sets of seven inputs and a single set of seven outputs. The outputs of the "or" gate 16 are coupled to the individual inputs of a second "or" gate 18 and also to seven inputs of a group of seven bistable multivibrators 20.

A bistable multivibrator has two stable states, and may comprise a symmetrical arrangement of two sections which provide simultaneous outputs of different amplitudes. This is, one section of the multivibrator provides a high level output while the other section provides a low level output. Because of the symmetry of the two sections, the outputs provided from the sections may be reversed to provide an opposite steady state condition. Input signals may be applied to a bistable multivibrator in either of two ways: (1) Input signals may be applied separately to the two different sections, or (2) input signals may be applied to both sections simultaneously. In this description, a signal applied to the input of one of the two sections causes the multivibrator to provide a high level output from that section. A signal applied to both sections simultaneously (at an input which may be called a "trigger" input) reverses the outputs provided from the two sections. The inputs and outputs for each section have been given particular designations herein. One section has a "reset" input and a "0" output, while the other section has a "set" input and a "1" output. A multivibrator is "reset" to a starting condition of "0," in this example, and may be then "set" to a "1" condition.

The second "or" gate 18 may be of the type similar to the component "or" circuits above described, although the second "or" gate 18 has seven inputs and a single output. The output of the second "or" gate 18 is coupled to six series-connected delay lines 22 to 32 each of which delays a signal a given amount. Couplings are made from between the second "or" gate 18 and the first delay line 22 to the data selection unit 10, from between each successive pair of delay lines 22 and 24 etc. and from the last delay line 32 of the series to the data selection unit 10. All outputs of the bistable multivibrators 20 are coupled to an array of recognition gates 34, which may be of a type to be later described. The outputs of the recognition gates 34, which here are signals of the occurrence of start message (SM), end message (EM), and item separator (ISS) signals, are coupled to the data selection unit 10. Outputs from the data selection unit 10 are coupled to the two inputs of a selection bistable multivibrator 36 which may be of the type previously described. A high level output on the "1" terminal of the selection multivibrator 36 provides a select data signal for use in the sorting system.

The inputs to the data selection unit 10 from the output of the second "or" gate 18, and from the various delay lines 22 to 32, carry a series of timing pulses generated on the occurrence of individual signals at the tape reading stations 12. The separate conductors coupled to the data selection unit 10 have accordingly been designated in correspondence to the sequential pulse they carry as TP1 to TP7.

In this system, the useable output of a bistable multivibrator is the high level output from a terminal. For purposes of illustration herein, such an output is also designated by a corresponding binary significance. Thus, a useable high level output from the "1" terminal is also termed a "1" output.

Figure 2:
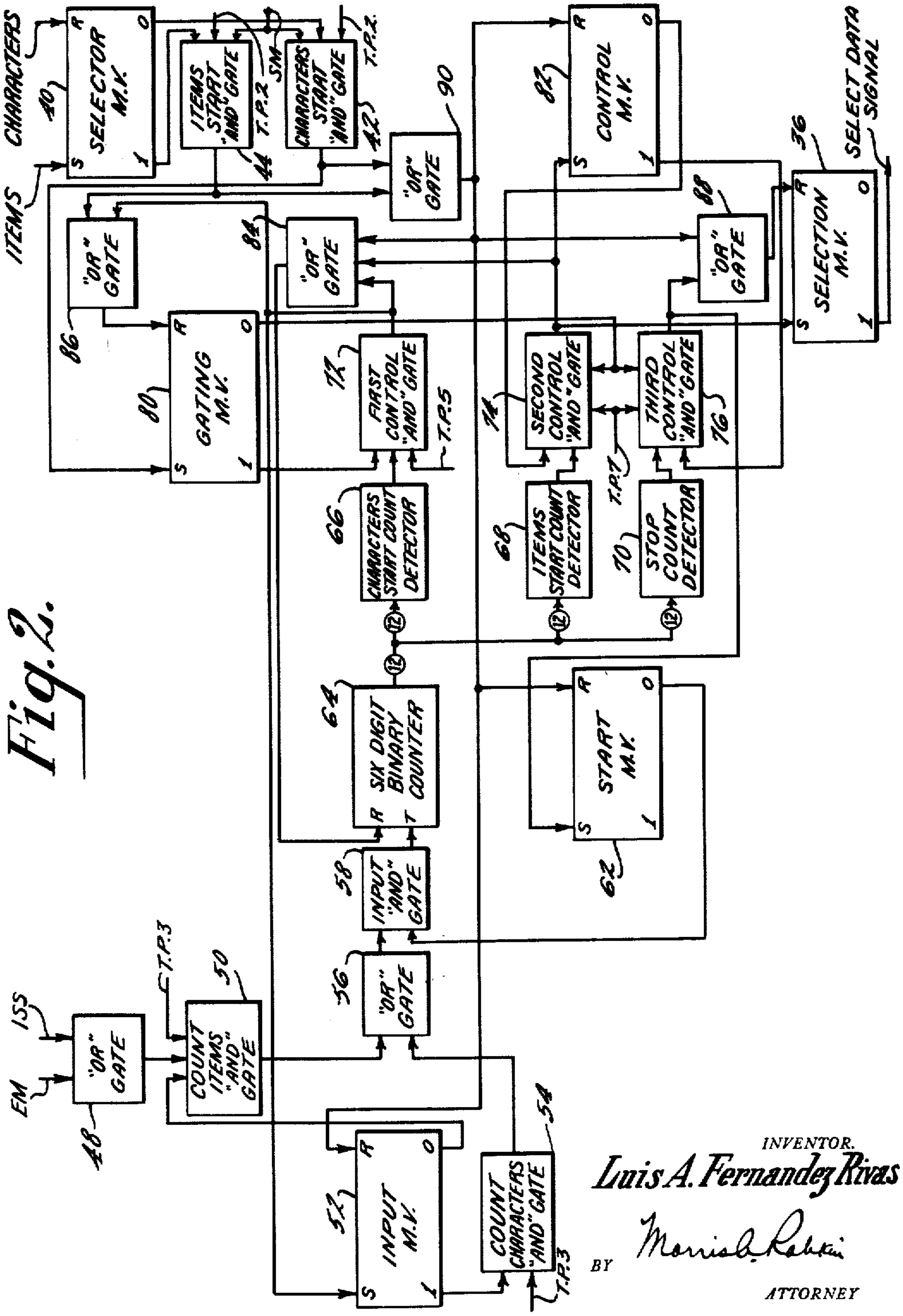
Fig. 2 is a block diagram of an arrangement which may be employed as the data selection unit in the system of Fig. 1.

A data selection unit 10 appropriate for the system of Fig. 1 is shown in Fig. 2. Referring to Fig. 2, note that certain inputs are applied from points designated as to the significance of the input. These designations, such as SM, EM, ISS, and TP2, signify the point of origination of the signal in Fig. 1. The complete coupling and the associated circuitry have been omitted in Fig. 2 for simplicity and clarity.

In Fig. 2, items or characters may be selected as the criterion for the selection of data through use of a selector bistable multivibrator 40. The selector bistable multivibrator 40 may be of the type previously described, and its sections are similarly designated. If characters are to be the basis of selection a signal is applied to the reset input of the selector multivibrator 40. If items are to be the basis of selection a signal is applied to the set input of the selector multivibrator 40. The "0" output is connected to one input of a character start "and" gate 42 and the "1" output is connected to one input of an items start "and" gate 44. An "and" gate, sometimes called a coincidence gate, has a number of inputs, and provides an output signal when and only when signals are present on each of its inputs. Both the items start "and" gate 44 and the characters start "and" gate 42 are three input gates, and each has one input coupled to a source of SM signals (not shown), and another input coupled to a source of TP2 signals (not shown). The SM and TP2 signals are derived, as previously explained, from units within Fig. 1.

Other signals representing information are applied to the system of Fig. 2 from the units of Fig. 1. These signals, as indicated in Fig. 2, are the EM, ISS, TP2, TP3, TP5, and TP7 signals. The EM and ISS signals are applied to the two inputs of an "or" gate 48 of Fig. 2, the output of which is applied to one input of a count items "and" gate 50. A second input is applied to the count items "and" gate 50 from TP3, and a third input from the "0" terminal of an input bistable multivibrator 52. The input bistable multivibrator 52 and the count items "and" gate 50 are devices similar to those previously described for such units. The "and" gates, "or" gates, and the multivibrators hereinafter referred to may be the types respectively previously described. The "and" and "or" gates may, however, differ in the number of inputs they possess.

The "1" output of the input multivibrator 52 is applied to an input of a count characters "and" gate 54 having another input to which TP3 signals are applied. The output of the count characters "and" gate 54, and the output of the count items "and" gate 50 are applied to the two inputs of an "or" gate 56. The output of this last mentioned "or" gate 56 is applied to one input of an input "and" gate 58. The input "and" gate 58 has two inputs, the other input receiving signals from the "0" terminal of a start bistable multivibrator 62.

The output of the input "and" gate 58 is applied to the trigger input (designated T) of a six digit binary counter 64. Binary counters are well known in the computing and data-handling arts. Such counters may comprise a plurality of bistable multivibrators having trigger inputs. The multivibrators are connected in cascade and the counter has a single external trigger input at the multivibrator which represents the lowest order in the cascade. A sequence of pulses applied to the external trigger input causes successive changes in the steady states of the multivibrators in a binary counting fashion. That is, when starting from a common reset condition, a first trigger input causes the lowest order multivibrator to switch to a set condition, but the succeeding multivibrators are not affected. When the lowest order multivibrator receives another triggering impulse, however, the lowest order multivibrator reverses to its original (reset) state, and the succeeding multivibrator is turned over to a set condition. As stated previously, the effect is a binary progression, which causes a representation in binary form of the count at each trigger input. The six digit binary counter 64 has a reset input, an impulse on which causes all of the multivibrators within the counter to revert to a reset, or "0" condition.

A six digit binary counter provides counts from 0 to 63, which suffices for normal data selecting operations. The counter 64 has two output conductors for each binary stage, one conductor representing binary "1" and the other representing binary "0." The total of twelve conductors are coupled to three count detecting arrangements: (1) A "characters" start count detector 66, (2) an "items" start count detector 68, and (3) a stop count detector 70. Each of these detectors 66, 68, 70 provides a steady state output when a given (predetermined) count in binary form is present on its inputs. An arrangement which may be utilized for this application is shown and described in the copending application of Smith previously referred to. As described in that application, relays (not shown in Fig. 2) may be utilized to set up the binary count which it is desired to detect.

The output of the "characters" start count detector 66 is applied to one input of a first control "and" gate 72. The output of the "items" start count detector 66 is applied to one input of a second control "and" gate 74, and the output of the stop count detector 70 is applied to one input of a third control "and" gate 76. The three control "and" gates 72, 74, 76, together with the selector multivibrator 40, form the principal parts of a unit which may be described as a sequence control for the component parts of the data selection unit. The sequence control includes additionally a gating bistable multivibrator 80, a control bistable multivibrator 82, and a number of "or" gates.

Signals from the "1" terminal of the gating multivibrator 80 are applied to an input of the first control "and" gate 72. Signals from the "0" terminal of the gating multivibrator 80 are applied to an input of each of the second and third control "and" gates 74 and 76. Another input to the first control "and" gate 72 is applied from TP5. Individual inputs are applied to both the second and third control "and" gates 74 and 76 from TP7.

The "1" output of the control multivibrator 82 is coupled to the remaining input of the third control "and" gate 76, and the "0" output of the control multivibrator 82 is coupled to the remaining input of the second control "and" gate 74. The inputs to the gating multivibrator 80, the control multivibrator 82, and to a selection bistable multivibrator 36, are derived from a number of sources to be described hereinafter.

The output of the first control "and" gate 72 is applied directly to the set input of the input multivibrator 52, through an "or" gate 84 to the reset input of the counter 64, and through an "or" gate 86 to the reset input of the gating multivibrator 80. The output of the second control "and" gate 74 is applied (1) to the set input of the selection multivibrator 36, (2) to the set input of the control multivibrator 82, and (3) to the reset input of the counter 64 through the "or" gate 84. The output of the third control "and" gate 76 is applied (1) to the set input of the start multivibrator 62, and (2) through an "or" gate 88 to the reset input of the selection multivibrator 36.

The outputs of each of the items start "and" gate 44 and the characters start "and" gate 42 are applied through an "or" gate 90: (1) to the reset input of the control multivibrator 82, (2) to the reset input of the selection multivibrator 36 through the "or" gate 88, (3) to the reset input of the input multivibrator 52, (4) to the reset input of the binary counter 64 through the "or" gate 84, and (5) to the reset terminal of the start multivibrator 62. The output of the items start "and" gate 44 is also applied to the reset input of the gating multivibrator 80 through the "or" gate 86. The output of the characters start "and" gate 42 is applied additionally to the set input of the gating multivibrator 80. The "1" terminal of the selection multivibrator 36 provides the signal which represents the output of this arrangement. The output from the "1" terminal of the selection multivibrator 36 has accordingly been designated as carrying the select data signal.

In operation, a system (refer to Fig. 1) in which the present invention may be employed may operate from any of a number of input tapes. Each of the tapes may carry sequences of characters in the alpha-numeric code, and the tape reading station 12 for each tape may generate the signals for each character as the tape is passed adjacent the heads within the station 12. The pattern of signals generally encountered may consist, as previously explained, of messages carrying various items such as name, address, and occupation. It may be desired that the data selection unit 10 provide a signal only during the time that a given portion of each message is being read. It may be desired, for example, to provide a select data signal during the occurrence of the fourth, fifth, sixth, and seventh items in each message. Alternately, it may be desired to provide a select data signal after by-passing first a given number of items, then a given number of characters and on the occurrence of a predetermined number of the following characters. The select data signal thus provided may be employed elsewhere as a basis for the further manipulation of the messages in which the data is found.

Each character of a message is generated at a tape reading station 12, directed to and through the first "or" gate 16, and then applied to the second "or" gate 18 and to the seven bistable multivibrators 20. A signal in any one of the channels is sufficient to provide an output in the corresponding channel from the first "or" gate 16, and also to provide an output on the single output line of the second "or" gate 18. The signal also is applied to the set input of the multivibrator 20 in that channel, so that the multivibrator 20 provides a high level output on its "1" terminal. The binary configuration generated at the reading heads and in the conductors 14 represents a combination of binary "1's" and binary "0's," and a similar binary representation is provided by the multivibrators 20. All bistable multivibrators 20 start from a condition in which they provide outputs from their "0" terminals, because a reset impulse is applied by TP6 following the application of each character signal. The generation of any character signal also produces a definite sequence of timing pulses following the character signal, because an output is provided from the second "or" gate 18 successively through each of the delay lines 22 to 32.

Figure 3:
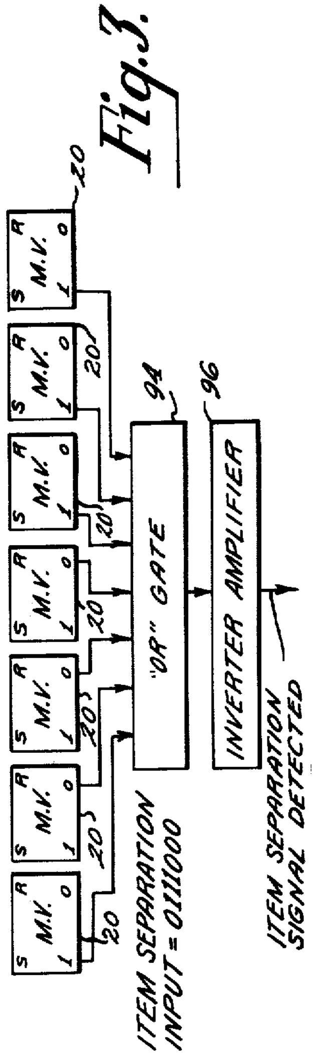
Fig. 3 is a block diagram of a recognition gate which may be employed in providing certain signals for a data selection unit.

The recognition gates 34 (refer now also to Fig. 3) provide outputs whenever the configuration of inputs fits a desired pattern. The recognition gate arrangement is intended to provide a high level signal in the absence of high level outputs from given terminals of the multivibrators 20. As an example, it may be desired to provide a signal indicating the existence of an item separator signal, chosen arbitrarily as 0111000. It would be possible to detect the coincidence of outputs from the corresponding terminals of the multivibrators 20. The mechanization is simplified, however, when the opposite condition (the absence or the complement of each digit) is detected. Therefore, the outputs of the various multivibrators are coupled to a seven input "or" gate 94 in the pattern1000111, each binary digit being the complement of the binary digit it is desired to recognize. When each, or any, of the chosen sections is providing a high level output, the "or" gate 94 is also providing a high level output, and the coupled inverter amplifier 96 is providing a low level output. When each of the chosen sections is providing a low level output, however, the desired configuration of signals is present on the multivibrators 20. Consequently, only low level outputs from the multivibrators 20 are applied to the "or" gate 94, and a high level output is provided from the inverter amplifier 96. The high level output signals that an item separation signal has been detected. Similar units, each set to represent a different binary configuration, may be employed with the same multivibrators 20.

The data selection unit 10 operates on the outputs of the recognition gates 34 and on the sequences of timing signals to determine when to provide the select data signal. Since final control is exercised through a selection multivibrator 36, the selection multivibrator 36 is illustrated in Fig. 1 as being a separate element from the data selection unit 10.

The data selector unit (refer now to Fig. 2) may select a given sequence of items following the commencement of a message, or select a given sequence of characters following a given number of items and then a given number of characters.

Before beginning operation in the first way, the selector multivibrator 40 is impulsed on the set (items) side, so that the selector multivibrator 40 provides an output on its "1" terminal. The count detectors 66, 68, 70 are set to determine the existence of desired counts in the binary counter 64. Thus, the "items" start count detector 68 may be set to detect a count of four, and the stop count detector 70 may also be set to detect a count of four. This should provide a select data signal during the occurrence of the fourth, fifth, sixth, and seventh items following the start of a message.

The detection of a start message signal commences the cycle of operation of the arrangement. The SM signal is provided as a steady state output, and is followed shortly thereafter by TP2, as explained with reference to Figs. 1 and 3. Therefore, all inputs to the items start "and" gate 44 are activated (from the selector multivibrator 40, TP2, and SM) and the items start "and" gate 44 provides an output. This output serves to place the system in a starting condition, since the output is applied to the reset inputs of each of the multivibrators and to the reset input of the binary counter. More specifically, the output of the items start "and" gate 44 is applied: (1) to the reset input of the gating multivibrator 80 through the "or" gate 86, (2) through the "or" gate 90 to the reset input of the control multivibrator 82, and also to the reset input of the start multivibrator 62 and the reset input of the input multivibrator 52, (3) to the reset input of the binary counter 64 through the "or" gate 84, and (4) to the reset input of the selection multivibrator 36 through the "or" gate 88.

In this description of the operation of Fig. 2, an "and" gate input which is activated by a steady (as opposed to a pulse) signal will alternatively be referred to as being "primed." The "priming" of a gate prepares it for providing an output when other conditions are satisfied. Following the start message signal, therefore, the input multivibrator 52 is providing a high level output from its "0" terminal to prime the count items "and" gate 50, the start multivibrator 62 is providing a "0" output to prime the input "and" gate 58, the binary counter 64 is set at "0," the gating multivibrator 80 is providing a "0" output to prime the second and third control "and" gates 74 and 76, the control multivibrator 82 is providing a "0" output to prime one input of the second control "and" gate 74, and the selection multivibrator 36 is providing a "0" output which indicates that data is not to be selected.

The arrangement is set at this time to count three items before providing the select data signal. The three items are counted by detecting the ISS signals which follow the SM signal and the first three items, applying the signals resulting from the detection to the counter 64, and detecting the arrival of the counter 64 at the count of four. The arrangement by which proper signals are applied to the counter 64 may be termed an input transfer means. A signal which indicates the presence of an ISS signal is provided as a steady state signal from the recognition gate arrangement (such as Fig. 3) through the "or" gate 48 to the count items "and" gate 50. One input of the count items "and" gate 50 is already primed by an output from the input multivibrator 52, and the remaining input to the gate 50 is activated by TP3 shortly after the establishment of the ISS signal. On the coincidence of these three signals, therefore, the count items "and" gate 50 provides a signal through the "or" gate 56 coupled to its output to one input of the input "and" gate 58. The only remaining input of the input "and" gate 58 is at this time already primed by the start multivibrator 62, so that each ISS signal is provided as a trigger input to the binary counter 64. The configuration of outputs on the binary counter 64 thus changes in binary fashion until a count of four is present, when the "items" start count detector 68 provides an output.

The output of the "items" start count detector 68 is a steady state signal and activates one input of the second control "and" gate 74. Two other inputs of the second control "and" gate 74 are activated individually by the gating multivibrator 80 and the control multivibrator 82 (these multivibrators providing "0" outputs following the SM signal). The sole remaining input of the second control "and" gate 74 is activated on the occurrence of TP7 following the generation of the character signal. The second control "and" gate 74 then provides an output which has the following effects: (1) the output sets the selection multivibrator 36, so that the selection multivibrator 36 provides a select data signal from its "1" terminal, (2) the output signal activates the set input of the control multivibrator 82 so that the control multivibrator 82 provides a "1" output to activate one input of the third control "and" gate 76 instead of the second control "and" gate 74, as previously, and (3) the output impulses the reset input of the binary counter 64 through the "or" gate 84 to set the counter 64 back to "0."

The arrangement is now providing the select data signal, and will continue to do so until the desired number of items have been selected. The binary counter 64 is again at "0," and the count items "and" gate 50 and input "and" gates 58 are primed respectively by the input multivibrator 52 and the start multivibrator 62 to provide a signal transferring means for subsequent ISS signals. Therefore, further ISS (or EM) signals, and the subsequent TP3 signal cause outputs successively from the count items "and" gate 50, the succeeding "or" gate 56 and the input "and" gate 58. The outputs of the input "and" gate 58 are counted by the binary counter 64 and the counts are detected by the various count detectors 66, 68, 70. In this situation, however, the only count detector output which is utilized is that of the stop count detector 70, since only the third control "and" gate 76 is able to provide an output at this time. The third control "and" gate 76 has one input activated by the gating multivibrator 80 and another input activated by the control multivibrator 82, so that on the provision of an output by the stop count detector 70 and on the occurrence of the subsequent TP7, all inputs to the third control "and" gate 76 are activated. Note that the steady state conditions of the gating multivibrator 80 and the control multivibrator 82 cause inactivation of one input each of the first control "and" gate 72 and the second control "and" gate 74, thus disabling those gates.

Following the initiation of a select data signal, therefore, the binary counter 64 counts four ISS or EM signals, the stop count detector 70 provides an output, and the third control "and" gate 76 provides an output. The third control "and" gate 76 output terminates the select data signal, because the output is applied to the reset input of the selection multivibrator 36 through the "or" gate 88. The third control "and" gate 76 output also places the start multivibrator 62 in a steady state condition which disables the input "and" gate 58, because the third control "and" gate 76 output is applied to the set input of the start multivibrator 62. The system therefore does not provide further select data signals until the start multivibrator 62 is reset again, thus activating the corresponding input of the input "and" gate 58.

A new cycle of operation is commenced by the application of an SM signal and the subsequent TP2 signal. As stated previously, these signals provide an output from the items start "and" gate 44 which is employed to reset all the multivibrators 36, 52, 62, 80 and 82 and the binary counter 64.

Assume now that as a second example it is desired to count and by-pass the first four ISS symbols (three items), and then two characters, and then to select the succeeding fifteen characters. For this operation, a "characters" signal is provided to actuate the reset input of the selector multivibrator 40, so that the selector multivibrator 40 provides a "0" output which activates one input of the characters start "and" gate 42. The operation then commences in the same manner as previously, with the binary counter 64 and the various multivibrators 36, 52, 62, and 82 being impulsed at their reset inputs, except that a signal is applied to the set input of the gating multivibrator 80. The gating multivibrator 80 therefore provides a "1" output which activates one input of the first control "and" gate 72, and which disables the second control "and" gate 74 and the third control "and" gate 76 by removing from each an activating signal for one input. ISS signals are then counted as previously by the binary counter 64, but the three item count (four ISS signals) is in this instance detected by the "characters" start count detector 66. The "items" start count detector 68, being set to two, would previously have provided an output, but that output would not have been utilized because of the disabled second control "and" gate 74. The output of the "characters" start count detector 66 on the occurrence of the count of four is, however, utilized to provide an output from the first control "and" gate 72 on the occurrence of the subsequent TP5 signal. The first control "and" gate 72 prepares the system to count the desired number of characters to be by-passed. This counting action is accomplished by utilizing the output of the first control "and" gate 72 to reset the binary counter 64 by the application of a reset impulse to the counter 64 through the "or" gate 84, and by the application of a reset impulse to the gating multivibrator 80 through the "or" gate 86. At this point in time, therefore, the binary counter 64 is again at "0" and the second control "and" gate 74 has two inputs primed, one by the gating multivibrator 80 and one by the control multivibrator 82. The output of the first control "and" gate 72 is also applied to the set input of the input multivibrator 52. The input multivibrator 52 in turn provides a "1" output which activates the count characters "and" gate 54 and disables the count items "and" gate 50. On the occurrence of individual characters thereafter, as denoted by the existence of TP3, both inputs of the count characters "and" gate 54 are activated, and that gate 54 provides an output. The outputs of the count characters "and" gate 54 are applied to the binary counter 64 through the coupled "or" gate 56 and the input "and" gate 58, and are counted by the counter 64. A count of two on the counter 64 is detected by the "items" start count detector 68.

The steady state output resulting from the "items" start count detector 68, and the subsequent TP7 signal cause activation of the remaining inactive inputs of the second control "and" gate 74, so that that gate 74 provides an output. The second control "and" gate output 74 (as in the previous example): (1) sets the selection multivibrator 36 to provide a select data signal, (2) sets the control multivibrator 82 to provide a "1" output for activating an input of the third control "and" gate 76, and (3) resets the binary counter 64 to "0" through the "or" gate 84. Thereafter, except for the fact that characters are counted instead of ISS and EM signals, the operation is as previously described. That is, signals counted by the binary counter 64 are detected on reaching a given count by the stop count detector 70, and the third control "and" gate 76 provides an output which resets the selection multivibrator 36 to terminate the select data signal and which sets the start multivibrator 62 to disable the input "and" gate 58.

Various modifications may be made in the components of this system without affecting the nature or operation of the system as a whole. For example, the selector multivibrator may be replaced, if desired, by a simple two position switch. The various "or" and "and" gates may employ vacuum tubes or rectifying elements to achieve the desired gating operations. Such gates, as well as the various multivibrators, may be of a standardized design.

The provision of timing pulses enables the smooth passage of information in pulse form through the various switching and gating elements of the system. Because an electronic design is employed, the spacing between successive timing pulses need be only a few micro-seconds. The spacing permits signals to flow through the various units such as the counter in orderly fashion, and permits generation and succession of the data selection signal in accordance with requirements of external utilization devices, which may operate upon the same sequence of timing pulses.

Thus there has been provided an efficient, rapid, and reliable data selection unit for a data processing system. The device combines a considerable number of functions in an integrated fashion, yet employs only a single binary counter and standardized gating units. The operation of the device is flexible and reliable.

What is claimed is:

1. In a system employing messages having trains of character signals formed into individual items, and having means to provide start and end message characteristic signals and item termination characteristic signals, said system having further means to provide a sequence of timing pulses following the occurrence of signals representing individual characters in said messages, an arrangement for providing a select data signal for selecting a given sequence of items or characters in said messages, said arrangement comprising a single means for counting signals, a plurality of means for detecting the occurrence of predetermined counts in said counting means, means for establishing the criteria of selection, sequence control means responsive to said count detecting means, said characteristic signals, said timing signals, and said criteria establishing means for utilizing said counting means and said count detecting means in a predetermined sequence, input transfer means responsive to said characteristic signals, said timing signals, said criteria establishing means and said sequence control means to provide preselected inputs to said counting means, and means responsive to said characteristic signals and said sequence control means to provide a select data signal on the occurrence of a given sequence of items or characters in said messages.

2. In a system having groupings of information including a sequence of blocks of information formed of individual characters represented by signals, an arrangement for selecting a desired information sequence from said groupings comprising means for detecting said blocks and said individual characters, a single counter, a plurality of count detecting means responsive to said counter, sequence control means coupled to said count detecting means for enabling selectively outputs of said count detecting means in a predetermined sequence, means responsive to said sequence control means and said outputs for coupling selectively said detecting means to the input of said counter, and means responsive to said detecting means and said sequence control means for providing signals for the selection of said desired information sequence.

3. In a system having messages comprised of trains of signals representing characters, said characters being grouped into individual items, each of said messages having start and end message characteristic signals and said items having termination characteristic signals, an arrangement for selecting a desired sequence of items or characters following the commencement of said messages comprising means for detecting said characteristic signals in said messages, means for detecting characters in said messages, a single binary counting means, a plurality of count detecting means responsive to said counting means, a plurality of control coincidence means each responsive to a different one of said count detecting means, means for providing separate item and character selection signals, input transfer means coupling said characteristic signal detecting means and said character detecting means to said counting means and responsive to said selection signals and said control coincidence means for selectively applying inputs to said counting means, gating means coupled to said counting means and responsive to said control coincidence means, said characteristic signal detecting means and said selection signals for providing a selected sequence of outputs, and means responsive to said characteristic signal detecting means and said gating means for providing signals for selecting said desired sequence of items or characters.

4. In a system for data processing which employs messages including individual items formed of trains of signals representing characters, said system including means to provide message start and end characteristic signals and means to provide item termination characteristic signals, said system also including means to provide a sequence of timing pulses following the occurrence of each character, an arrangement for providing a selection signal on the occurrence of a given sequence of items or characters comprising selective means for providing one of (1) a character selection signal and (2) an item selection signal, a binary counting means, first, second, and third settable coincidence means for detecting the occurrence of predetermined counts in said counting means, first, second, and third control coincidence means each responsive to the corresponding control coincidence means, input transfer switching means responsive to said characteristic signals, said timing signals, said selection signals, and said first and second and third settable coincidence means and coupled to said binary counting means to provide inputs selectively to said binary counting means (1) from said characteristic signals and (2) said timing signals, signal gating means responsive to said first, second, and third control coincidence means, said selection signals, and said characteristic signals and coupled to said counting means for utilizing outputs from said control coincidence means in a predetermined sequence, and a bistable means responsive to said second and third control coincidence means, said selection signals, and said timing signals for providing a selection signal on the occurrence of a given sequence of items or characters.

5. The invention as set forth in claim 4, wherein said input transfer switching means comprises means including an input bistable multivibrator and a pair of coincidence gates for selecting characteristic signals or timing signals (character presence signals) as input for said binary counting means, and means including a start bistable multivibrator and a coincidence gate for governing the application of the selected inputs to said binary counting means.

6. The invention as set forth in claim 4, wherein said signal gating means includes a gating bistable multivibrator having one stable condition which activates one input of said first control coincidence means and another stable condition which activates one input each of said second and third control coincidence means, said signal gating means also including a control multivibrator having one stable condition which activates one input of said second control coincidence means and another stable condition which activates one input of said third control coincidence means.

7. In a data selecting system which operates upon a sequence of input signals to select a sequence beginning and ending with given signals, an arrangement comprising a single binary counter responsive to said input signals, a plurality of settable coincidence detecting means responsive to said counter, a plurality of control coincidence means, each responsive to a different one of said settable coincidence detecting means, first and second bistable multivibrator means responsive to said control coincidence means for activating said control coincidence means in a predetermined sequence, and means responsive to said control coincidence means for providing selection signals during the occurrence of a desired sequence of input signals.

8. In a data selecting system which operates upon a sequence of input signals to select a sequence beginning and ending with given signals, an arrangement comprising a single binary counter responsive to said input signals, first, second, and third settable coincidence detecting means responsive to said binary counter for providing individual outputs on the occurrence of given counts on said binary counter, first, second, and third control coincidence gates, each responsive to the corresponding one of said settable coincidence means, a first bistable multivibrator means responsive to said first control coincidence gate for selectively activating said first control coincidence gate individually and said second and third control coincidence gates together, a second bistable multivibrator means responsive to said second control coincidence gate for activating said second and third control coincidence gates individually, and means responsive to said control coincidence gates for providing selection signals during the occurrence of a desired sequence of input signals.

9. In a system for handling information represented by trains of character signals grouped into items and messages, said messages commencing and terminating in characteristic signals and said items terminating in characteristic signals, an arrangement for signalling the presence of a desired sequence of said signals in each of said messages comprising a counter for counting said signals, a plurality of count detectors each individually settable and responsive to predetermined counts in said counter for coupling selectively said character signals and said characteristic signals to said counter on the occurrence of predetermined counts and for resetting selectively said counter, and means responsive to said count detectors and said characteristic signals for signalling the presence of said desired sequence.

10. In a system for handling information represented by trains of character signals grouped into items and messages, said messages commencing in characteristic signals and said items and said messages terminating in characteristic signals, an arrangement for providing an indication during the presence of a preselected sequence of items or characters in each message comprising recognition means responsive to said characteristic signals, character detecting means, a counter, a plurality of count detecting means each responsive to the output of said counter for signaling the presence of a predetermined count, means responsive to said count detecting means for coupling said recognition means and said character detecting means selectively to the input of said counter, and means responsive to said recognition means and said count detecting means for providing an indication during the presence of said preselected sequence.

11. In a system for handling information represented by trains of character signals grouped into items and messages, said messages commencing and terminating in special signals and said items terminating in special signals, the combination comprising a counter, a plurality of individually settable count detectors responsive to the output of said counter for signalling predetermined counts, a plurality of control gates each connected to the ouput of a different one of said count detectors, a sequence control circuit for selectively enabling said control gates, means responsive to said sequence control circuit and said control gates for selectively applying said character signals and said special signals to said counter, and signalling means responsive to the outputs of ones of said control gates and said special signals for signalling the presence of a desired sequence of said character and special signals in each of said messages.

12. In a system for handling information represented by trains of character signals grouped into items and messages, said messages having special signals to indicate the commencement of said messages and special signals to indicate the termination of said items and said messages, an arrangement for signalling the presence in each of said messages of a desired sequence of said signals comprising a counter responsive to said signals, a plurality of count detecting means responsive to said counter, means for providing separate item and character selection signals depending upon the selection criterion of the said desired sequence, means responsive to said selection signals for sequentially enabling the outputs from said count detecting means, means responsive to various ones of said outputs and said selection signals for applying selectively said special signals and said character signals to said counter, and means responsive to said special signals and ones of said outputs for signalling the presence of said desired sequence.

References Cited in the file of this patent

UNITED STATES PATENTS

| | | |
|---|---|---|
| 2,095,730 | Bellamy | Oct. 12, 1937 |
| 2,172,596 | Saunders | Sept. 12, 1939 |
| 2,404,654 | Potts | July 23, 1946 |
| 2,609,451 | Hansen | Sept. 2, 1952 |
| 2,620,878 | Rabenda | Dec. 9, 1952 |
| 2,656,524 | Gridly | Oct. 20, 1953 |
| 2,688,438 | Breese | Sept. 7, 1954 |
| 2,782,398 | West | Feb. 19, 1957 |